United States Patent Office 3,737,322
Patented June 5, 1973

3,737,322
TREATMENT OF ARABINOGALACTAN
Robert R. Frey, Huntingdon Valley, Pa., assignor to Richardson-Merrell Inc., New York, N.Y.
No Drawing. Filed Mar. 17, 1971, Ser. No. 125,359
Int. Cl. A23g 1/00; A23l 1/26
U.S. Cl. 99—23                          22 Claims

ABSTRACT OF THE DISCLOSURE

The tendency of arabinogalactan, a low-calorie sugar substitute for use in foods, to absorb fat and become unmanageable in food processing operations may be controlled by treating the arabinogalactan with saccharides and other edible polyhydroxy compounds.

BACKGROUND OF THE INVENTION

The desirability of providing low calorie food for those who wish to control their tendency to be overweight is well known and various low calorie food products have been prepared and offered for sale. Inasmuch as common sugar (sucrose) is high in calories and its sweetening effect can be obtained with relatively low calorie artificial sweeteners such as saccharin, many products have been offered which are sugar-free, the sweetening effect being obtained with an artificial sweetener. However, in the case of many foods, sucrose cannot be replaced with a low volume, high intensity sweetening agent because the sugar performs another essential function, such as providing bulk in the food. Accordingly, various low calorie hydrophilic colloids such as carboxy-methyl cellulose, alginates, gelatin, gum carrageenan and the like have been used to replace the bulk normally provided by sugar. Replacement of sugar with these gums is not always effective because the finished food product is lacking in certain physical and organoleptic properties which are required. Also, many of the earlier sugar substitutes developed undesirable properties in the finished food.

U.S. Pat. No. 3,294,544, issued Dec. 27, 1966 to George L. Stanko, discloses that arabinogalactan be used as a sugar substitute for the preparation of many food products including baked goods, icings, candy, ice cream, salad dressings, and the like without development of the undesirable properties often encountered when other gums are used as sugar substitutes. This patent discloses that arabinogalactan is non-digestible and does not contribute calories to food products to which it is added. It may replace sugar on an equal weight basis in many foods and, while it is not sweet, the desired sweetness may be obtained by adding a variety of synthetic or artificial sweetening agents to the food product.

Arabinogalactan is a tasteless, water-soluble polysaccharide which can be extracted from the wood of the western larch tree. It is a highly branched polymer of arabinose and galactose in a ratio of about 1:6, respectively. Its polymeric fractions have a molecular weight of from about 30,000 to 100,000. The chemical and physical properties or arabinogalactan and methods for extracting it are described in the literature and patents which include U.S. Pats. 2,073,616 to Acree, 3,325,473 to Herrick et al., 3,337,526 to Adams, and 3,509,126 to Dahl.

It has been found that while arabinogalactan is a suitable substitute for sugar on an equal weight basis in many food products, it cannot be used as a simple replacement for sugar in many such products containing a large amount of fat. When 100 parts of a vegetable fat having a melting point of around 95° F. is combined with 100 parts of finely powdered sugar, the mixture is a thin, pourable liquid at 100° F. There is little interference between the sugar and the molten vegetable fat and the viscosity of the mixture is not much different than that of the melted vegetable fat alone. However, when a similar mixture is made with 100 parts of the identical vegetable fat and 100 parts of finely powdered arabinogalactan, the resulting mixture is a very thick, dough-like product at 100° F., which has no pourability. Apparently, the finely powdered arabinogalactan absorbs the molten fat, much as one would expect sawdust to do. Arabinogalactan cannot, therefore, be used as a simple sugar substitute in such circumstances.

Arabinogalactan can be suitably fluidized to a lower viscosity by the addition of further amounts of a vegetable fat. For instance, a chlocolate coating containing arabinogalactan in place of sugar and being suitable for coating candy bars was prepared by adding more cocoa butter. It was compared with a conventional chocolate coating of the same viscosity and at a temperature suitable for dipping chocolates. The conventional chocolate coating contained 33% by weight of commercial chocolate liquor, which is the product obtained by finely grinding cocoa beans. It contains approximately 53% cocoa butter, the balance being the cocoa bean pulp. Since this liquor is too strong in flavor and bitter in taste for some chocolate products, it is sweetened with powdered sugar and additional cocoa butter is added for reducing the strong bitter taste of the cocoa bean pulp to obtain the correct fluidity for dipping chocolates and to impart a more pleasant melting sensation when eaten. A small amount of lecithin was also added to reduce the viscosity of the dipping coating to 6000 cps. at 105° F. A similar chocolate coating was prepared using the same amount of chocolate liquor but substituting for the sugar powdered arabinogalactan and sufficient cocoa butter to give the final preparation the same viscosity as the regular chocolate dipping liquor. These formulations and their caloric content are compared in the following table.

TABLE I

|  | Sugar formula viscosity 6,000 cps. at 105° F. | | Arabinogalactan formula viscosity 6,000 cps. at 105° F. | |
| --- | --- | --- | --- | --- |
|  | Percent | Cal./100 gm. | Percent | Cal./100 gm. |
| Chocolate liquor (6.75 cal./gm.) | 33 | 223 | 33 | 223 |
| Powdered sugar (4 cal./gm.) | 51 | 205 |  |  |
| Powdered arabinogalactan |  |  | 28 | 0 |
| Cocoa butter (9 cal./gm.) | 16 | 144 | 39 | 351 |
| Leicithin | .25 |  | .25 |  |
| Total |  | 572 |  | 574 |

As will be seen from the foregoing, when arabinogalactan was used to replace the sugar in a chocolate coating, there was no reduction in calories because the cocoa butter content had to be raised to compensate for the thickening action of the arabinogalactan. It is apparent, therefore, that in preparations such as the one described above arabinogalactan cannot replace sucrose on a weight basis to provide a food product which has a reduced calorie content.

THE INVENTION

The present invention is based upon my discovery that arabinogalactan can be treated with sorbitol and other related polyhydroxy compounds to provide a low-calorie arabinogalactan product which does not absorb vegetable fats and which can be used to replace sucrose on an equal weight basis in food products which may contain large amounts of vegetable fats.

A preferred method of preparing the treated arabinogalactan in accordance with the present invention to reduce its fat absorbing, or thickening, properties is as follows:

A solution containing 300 parts of sorbitol (dry basis) and 250 parts of water is heated to about 210° F. (just below boiling). 1530 parts of powdered arabinogalactan are added very slowly with continual mixing and heating (maintaining temperature at about 200° F.). The resulting mix is a dry semi-solid similar in consistency to a very stiff dough. Upon cooling, the mass solidifies. This solid is pulverized to form a coarse powder of about 8 mesh and dried for about 4 hours at 50° C. The dried product may then be further pulverized and milled to form a very fine powder which contains approximately 80% arabinogalactan, 15% sorbitol and 5% water.

The above powder (for convenience identified as "treated" arabinogalactan) when added to a fat system consisting largely of cocoa butter or similar vegetable fats, does not thicken the fat to any greater extent than sugar. To illustrate this, further chocolate coatings were prepared. The fat content was varied in each of the four samples reported below so that the viscosity of each was identical (6000 cps. at 105° F.).

TABLE II

|  | Percent | | | |
| --- | --- | --- | --- | --- |
|  | Sugar formula | Untreated arabinogalactan formula | "Treated" arabinogalactan formula | Arabinogalactan sorbitol formula |
| Chocolate liquor | 33 | 33 | 33 | 33 |
| Powdered sugar | 51 | | | |
| Untreated arabinogalactan | | 28 | | 26 |
| "Treated" arabinogalactan | | | 52 | |
| Powdered sorbitol | | | | 6 |
| Cocoa butter | 16 | 39 | 15 | 35 |
| Lecithin | .25 | .25 | .25 | .25 |

These tests clearly indicate that it is the "treatment" of arabinogalactan with an aqueous solution of the polyhydroxy compound that markedly reduces the fat-absorbing properties of arabinogalactan. Note that the physical mixing of powdered sorbitol with arabinogalactan did not have any appreciable effect, since a large amount of fat was necessary to obtain a workable viscosity. Obviously, the treated arabinogalactan gave a chocolate coating of greatly reduced calorie content because of the non-metabolizable nature of the arabinogalactan when it is consumed.

Although it is necessary that the polyhydroxy compound used to treat the arabinogalactan be soluble in water and dissolved therein at the time of treatment, it is not necessary that the arabinogalactan be dissolved. Since arabinogalactan is highly soluble in water, some of it will dissolve in the solution carrying the treating agent. As a matter of fact, however, all of the arabinogalactan can be dissolved in the water with the treating agent and the same desired effect will be obtained. The only difficulty in such case is that more water must eventually be removed to obtain a dry product which can be pulverized so that it can be readily mixed into food products in which it maye be used in place of sugar.

The treated arabinogalactan can be ground to any desired degree of fineness. In some food products such as chocolate, the entire mixture, including the ground cocoa bean liquor, the cocoa butter and flavoring agents, is usually ground together so that the final product is smooth to the tongue. Eventually, none of the particles in the chocolate should be more than about 35 microns in diameter to avoid a gritty effect.

The manner in which the treatment of arabinogalactan with a polyhydroxy compound reduces the fat absorbency of the arabinogalactan is not known with certainty. However, the polyhydroxy compound that is used in practicing the invention should be one which is readily compatible with arabinogalactan. Saccharides such as arabinose and galactose, which together make up arabinogalactan, are obviously compatible, but are too expensive for use in most foods. Sucrose, glucose and sorbitol and other common low-cost saccharides are particularly useful. Since the object of the treatment is to reduce the fat-absorbing properties of arabinogalactan, the treating agent which is used to either coat the arabinogalactan particles or to fill the interstices of their structure should be fat-insoluble so that fats do not displace the treating agent from the arabinogalactan particles. The treating agent should also be water-soluble, edible, non-toxic, and have little or no flavor of its own except possibly sweetness. It should also have as low as caloric value as possible, although the preferred treating agents, sucrose and sorbitol, for instance, have a caloric content equal to that of sugar.

The amount of the polyhydroxy compound that is used in practicing the invention may vary from about 0.5 part to 10 parts of the polyhydroxy compound for each 10 parts by weight of the arabinogalactan that is treated. Obviously, when using metabolizable polyhydoxy compounds which would contribute a caloric effect to the resulting product, minimum amounts should be used. This is also true if the treated arabinogalactan is to be used in preparing food products having a relatively low fat content. In chocolate foods, such as illustrated hereinabove, which have a relatively high cocoa butter content, it has been found that as little as 1 part of sorbitol for each 10 parts of arabinogalactan gives almost complete protection against fat absorption by the arabinogalactan. Of course, when calorie reduction in the finished product is not of primary importance, the amount of the polyhydroxy compound may be increased.

A non-inclusive list of polyhydroxy compounds which can be used in aqueous solutions instead of, or in combination with each other or with sorbitol are the saccharides such as mannitol, xylitol, xylose, dextrose, maltose, fructose, lactose, sucrose, arabinose, galactose, invert sugar, corn syrup, hydrogenated corn syrup and the like. Polyethylene glycol, methyl cellulose, hydroxyethyl cellulose, and other edible polyhydroxy compounds may also be used. When using non-saccharides such as the last two compounds just mentioned, care should be used to avoid excessive use of those which have substantial gummy characteristics, since in most food products, and particularly chocolate preparations, the product should not adhere to the teeth when chewed. In many other products excessive gumminess is to be avoided. The polyhydroxy compound should, therefore, be characterized as being non-gummy, although some suitable treating agents, which are characterized in the trade as being gums, do not have this property to such as extent that they are unduly gummy and cannot be used.

The following examples are illustrative of the invention.

EXAMPLE 1

A chocolate coating can be made as follows:

Heat 2.75 kg. of a solution containing 1500 gms. of sorbitol (dry basis) and 1250 ml. of water to 205° F. Slowly add 7.65 kg. of arabinogalactan with continued heating (maintain temperature at about 200° F.) and mixing. Roll hot semi-solid mass into a flat sheet (to facilitate cooling and grinding) and allow to cool. The mass is then pulverized to a coarse powder, spread onto flat trays and dried for about 4 hours at 50° C. This dried coarse powder is made into a chocolate coating in an accepted manner as follows:

3.3 kg. of chocolate liquor and .6 kg. of cocoa butter is melted in a suitable container. 5.2 kg. of the coarse powdered "treated" arabinogalactan is blended in to form a thick viscous paste. This is passed through a 3-roller mill to reduce the particle size of the treated arabinogalactan so that the resulting mass does not feel gritty in the mouth. 9.1 kg. of the above is added to .9 kg. of melted cocoa butter and mixed, while kept at 105° F. for several hours. During this time various flavoring agents, flavor enhancers, etc. are added. Just before the end of the mixing, 25 gms. of soya lecithin is added. The resulting coating has a viscosity of about 6000 cps. at 105° F.

This coating is now ready for the usual tempering and enrobing or dipping operation. The chocolate liquor may also be poured into molds to form chocolate bars.

EXAMPLE 2

Heat 2.75 kg. of a solution containing 1500 gms. of invert sugar (dry basis) and 1250 ml. of water to 205° F. Slowly add 7.65 kg. of arabinogalactan with continued heating (maintain temperature at 200° F.) and mixing. Roll the hot mass into a flat sheet (to facilitate cooling and grinding) and allow to cool. Pulverize the mass to a coarse powder, spread onto flat trays, and dry for 4 hours at 50° C.

The above "treated" arabinogalactan is made into a chocolate coating as in Example 1. This coating also has a viscosity of about 6000 cps. at 105° F.

EXAMPLE 3

Heat 2.75 kg. of a solution containing 1 kg. of medium invert sugar (dry basis), .5 kg. of sorbitol (dry basis) and 1250 ml. of water. Add 7.65 kg. of arabinogalactan and proceed as in Example 1.

The coating is made by melting 2.55 kg. of hydrogenated coconut oil (Wiley melting point about 95° F.), adding 1.65 kg. of a low fat cocoa powder and 5.2 kg. of the above "treated" arabinogalactan (Example 3). This is passed through a 3-roller mill. 9.4 kg. of the above is added to .6 kg. of vegetable fat (same as above). Flavor enhancers, flavoring agents, etc. are added and the hot coating (at 105° F.) is mixed for several hours. As before, 25 gms. of soya lecithin is added. The coating had a viscosity of about 6000 cps. at 105° F.

EXAMPLE 4

A "milk" chocolate suitable for a chocolate bar was made by preparing the "treated" arabinogalactan as in Example 1. The "milk" chocolate was prepared by melting 1.6 kg. of chocolate liquor and 1.8 kg. of cocoa butter. 1 kg. of non-fat dried milk powder, 1 kg. of powdered sorbitol and 4.08 kg. of "treated" arabinogalactan (Example 1) are then added. The resulting viscous paste is then passed through a 3-roller mill. .52 kg. of melted cocoa butter is added. Flavor enhancers, flavoring agents, etc. are added and the hot mixture (at 105° F.) is mixed for several hours. 25 gms. of soya lecithin is added. The resulting "milk" chocolate had a viscosity of about 16,000 cps. at 105° F.

EXAMPLE 5

A "milk" chocolate suitable for a chocolate bar was made by preparing "treated" arabinogalactan as in Example 2. The "milk" chocolate was prepared by melting 2.55 kg. of hydrogenated coconut oil (Wiley melting point about 95° F.) and adding .8 kg. of low fat cocoa powder, 1.0 kg. of fine granulated sugar, 1 kg. of non-fat dried milk powder and 4.00 kg. of "treated" arabinogalactan (Example 2). The resulting viscous paste is then passed through a 3-roller mill. .65 kg. of melted vegetable fat is added. Flavor enhancers, flavoring agents, etc. are added and the hot mixture is mixed for several hours. 25 gms. of soya lecithin is added. The resulting chocolate has a viscosity of about 15,000 cps. at 105° F.

In addition to "milk" and sweet chocolates for both candy bars and coating of candy centers, other types of chocolate can be prepared such as dark chocolate and bittersweet chocolate; chocolate containing various nuts, dried cereals, fruits, etc.; and coating such as confectioners' coatings, white and pastel coatings, coatings for cookies and cakes and ice cream novelty coating.

Although the treated arabinogalactan prepared in accordance with the present invention will be most useful in connection with the preparation of chocolate products such as described above, the treated arabinogalactan may also be used to advantage in other fat-containing products wherein the fat component might cause untreated arabinogalactan to become unmanageable, or at least an unsatisfactory substitute, for sugar. Such products include salad dressings, ice cream, cakes, and cookies, icings, and other fat-rich foods.

EXAMPLE 6

A conventional butter frosting recipe taken from a cookbook is as follows:

⅓ cup soft butter, margarine, or shortening
⅛ teaspoon salt
3 cups sifted confectioners' sugar
⅛ to ¼ cup milk or cream
1½ teaspoon vanilla extract With electric mixer at medium speed (or with spoon), thoroughly mix butter with salt and 1 cup confectioners' sugar until light and fluffy. Add remaining sugar and milk alternately, beating till very smooth and of spreading consistency. Add vanilla.

When the confectioners' sugar is replaced with an equivalent amount of untreated arabinogalactan, the product is a stiff, dough-like particulate mass which could not be spread over a cake with a spatula to provide a smooth frosting. However, when an equal amount of the treated arabinogalactan of the present invention is used, the frosting had the same consistency and appearance as the original recipe in which confectioners' sugar is used.

What is claimed is:

1. A method of reducing the fat-absorbing characteristics of arabinogalactan with an aqueous solution containing, for each 10 parts by weight of arabinogalactan, an amount of 0.5 to 10 parts by weight of a polyhydroxy compound which is water-soluble, edible, non-toxic, and fat-insoluble, drying the resulting mixture and finely dividing it.

2. A method in accordance with claim 1 in which the polyhydroxy compound is a saccharide.

3. A method in accordance with claim 1 in which the polyhydroxy compound is sucrose.

4. A method in accordance with claim 1 in which the polyhydroxy compound is sorbitol.

5. A method in accordance with claim 1 in which the polyhydroxy compound is polyethylene glycol.

6. A method in accordance with claim 1 in which the polyhydroxy compound is hydroxyethyl cellulose.

7. A method of reducing the fat-absorbing properties of arabinogalactan which comprises the steps of preparing a concentrated aqueous solution of a saccharide and mixing therewith arabinogalactan in amounts varying from 0.5 part by weight to 10 parts by weight of the saccharide for each 10 parts by weight of the arabinogalactan, drying the mixture and finely dividing it to a particle size smaller than 8 mesh.

8. A composition of matter comprising 10 parts by weight of finely divided arabinogalactan mixed with an aqueous solution containing 0.5 to 10 parts by weight of a fat-insoluble, water-soluble, edible, non-toxic polyhydroxy compound.

9. A composition of matter in accordance with claim 8 in which the polyhydroxy compound is a saccharide.

10. A composition of matter in accordance with claim 8 in which the polyhydroxy compound is sucrose.

11. A composition of matter in accordance with claim 8 in which the polyhydroxy compound is sorbitol.

12. A composition of matter in accordance with claim 8 in which the polyhydroxy compound is polyethylene glycol.

13. A composition of matter in accordance with claim 8 in which the polyhydroxy compound is hydroxyethyl cellulose.

14. In a method of preparing foods of reduced caloric value in which the normal amount of sugar is reduced with arabinogalactan, which foods also contain a substantial amount of a fat, the improvement which comprises using in place of sugar finely divided arabinogalactan mixed with an aqueous solution of a fat-insoluble, water-soluble, edible, non-toxic polyhydroxy compound wherein the aqueous solution contains 0.5 to 10 parts by weight of the polyhydroxy compound for each 10 parts by weight of arabinogalactan.

15. A process in accordance with claim 14 in which the polyhydroxy compound is a saccharide.

16. A method in accordance with claim 14 in which the polyhydroxy compound is sucrose.

17. A method in accordance with claim 14 in which the polyhydroxy compound is sorbitol.

18. A process of preparing low-calorie chocolate which comprises using in place of sugar a finely divided arabinogalactan which is mixed with an aqueous solution of a fat-insoluble, water-soluble, edible, non-toxic polyhydroxy compound wherein the aqueous solution contains 0.5 to 10 parts by weight of the polyhydroxy compound for each 10 parts by weight of arabinogalactan.

19. A food product of reduced caloric value having normal amounts of fat but essentially sugar-free, the sugar being replaced with a finely powdered arabinogalactan product which has been prepared by mixing particles of arabinogalactan with a concentrated aqueous solution of a fat-insoluble, water-soluble, edible, non-toxic polyhydroxy compound wherein the aqueous solution contains 0.5 to 10 parts by weight of the polyhydroxy compound for each 10 parts by weight of arabinogalactan.

20. A composition in accordance with claim 19 in which the polyhydroxy compound is a saccharide.

21. Chocolate liquor substantially free of sugar but containing normal amounts of cocoa butter, the sugar being replaced with a substantially equal amount of finely divided arabinogalactan which has been mixed with an aqueous solution of a fat-insoluble, water-soluble, edible, non-toxic polyhydroxy compound wherein the aqueous solution contains 0.5 to 10 parts by weight of the polyhydroxy compound for each 10 parts by weight of arabinogalactan.

22. A chocolate liquor in accordance with claim 21 in which the polyhydroxy compound is a saccharide.

References Cited
UNITED STATES PATENTS 3,294,544  12/1966  Stanko _____ 99—141 A X ALVIN E. TANENHOLTZ, Primary Examiner J. R. HOFFMAN, Assistant Examiner U.S. Cl. X.R.

99—86, 134 R, 136, 139, 141 A, 144